United States Patent
Sawamoto

(10) Patent No.: US 7,493,218 B2
(45) Date of Patent: Feb. 17, 2009

(54) VEHICULAR CONTROL OBJECT DETERMINATION SYSTEM

(75) Inventor: Kiichiro Sawamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 509 days.

(21) Appl. No.: 11/256,041

(22) Filed: Oct. 20, 2005

(65) Prior Publication Data

US 2006/0089802 A1    Apr. 27, 2006

(30) Foreign Application Priority Data

Oct. 26, 2004    (JP)    ............... 2004-310278

(51) Int. Cl.
    *G06F 17/00* (2006.01)
(52) U.S. Cl. ............... 701/301; 701/1; 701/93
(58) Field of Classification Search ............ 701/1, 701/93, 300–302; 342/70; 180/167–168, 180/170; 340/425.5, 435–436
See application file for complete search history.

(56) References Cited

U.S. PATENT DOCUMENTS

| 6,087,975 | A | * | 7/2000 | Sugimoto et al. ............. 342/70 |
| 7,266,453 | B2 | * | 9/2007 | Sawamoto et al. ........... 701/300 |

FOREIGN PATENT DOCUMENTS

| JP | 06-231398 | 8/1994 |
| JP | 3183501 | 3/1998 |
| JP | 11-192858 | 7/1999 |
| JP | 2000-137900 | 5/2000 |
| JP | 2002-002426 | 1/2002 |
| JP | 2002-175599 | 6/2002 |
| JP | 2002-178787 | 6/2002 |
| JP | 2003-223700 | 8/2003 |
| JP | 2004-110394 | 4/2004 |
| JP | 2004-184331 | 7/2004 |
| JP | 2004-189177 | 7/2004 |

* cited by examiner

*Primary Examiner*—Yonel Beaulieu
(74) *Attorney, Agent, or Firm*—O'Melveny & Myers LLP

(57) ABSTRACT

A vehicular control object determination system includes: a radar device for detecting an object that is present in the direction of travel of a vehicle; a travel locus estimator for estimating a future travel locus of the vehicle; and a control object determiner for determining a control object based on a detection result obtained by the radar device, a travel locus estimated by the travel locus estimator. The control object determiner modifies the control object determination conditions when the estimated travel locus is not a straight line and the detected relative sideways speed is less than the threshold value, and when the estimated travel locus is a straight line and the detected relative sideways speed is equal to or greater than the threshold value, thereby preventing erroneous identification of a preceding vehicle traveling on an adjacent lane as a control object.

16 Claims, 6 Drawing Sheets

VEHICULAR CONTROL OBJECT DETERMINATION SYSTEM

RELATED APPLICATION DATA

The present application claims priority to Japanese priority application No. 2004-310278, filed Oct. 26, 2004, which is hereby incorporated in its entirety herein by reference.

BACKGROUND OF THE INVENTION

1. Field of the Invention

The present invention relates to a vehicular control object determination system that includes, an object detector for detecting an object that is present in the direction of travel of a vehicle, a travel locus estimator for estimating a future travel locus of the vehicle, and a control object determiner for determining a control object based on a detection result obtained by the object detector, a travel locus estimated by the travel locus estimator, and predetermined control object determination conditions.

2. Description of Related Art

Japanese Patent Publication No. 3183501 discloses a vehicular travel control system in which a future travel locus of a subject vehicle is estimated, and when tracking control is carried out by employing a preceding vehicle present on the travel locus as a control object, if it is detected that the subject vehicle changes lanes, the travel locus is shifted parallel by an amount corresponding to the width of the lane so as to set a new travel locus, and tracking control is carried out by employing a preceding vehicle present on the new travel locus as a control object. The Publication also discloses a vehicular travel control system in which, when it is detected that a subject vehicle changes lanes, tracking control is stopped or temporarily suspended, and when a driver thereafter operates a switch, tracking control is carried out by employing as a control object a new preceding vehicle on a travel locus of the subject vehicle.

In the above-mentioned former vehicular travel control system, the travel locus that has been estimated before changing lanes is shifted parallel to give a travel locus after changing lanes, but the actual travel locus after changing lanes does not always coincide with that obtained by shifting parallel the travel locus estimated before changing lanes and, in particular, there is a possibility that an erroneous determination might occur when determining whether or not a preceding vehicle that is far away from the subject vehicle is a control object. Further, in the above-mentioned latter vehicular travel control system, when the subject vehicle changes lanes, tracking control is stopped or temporarily suspended and the tracking control is not resumed until the driver operates a switch, resulting in a deterioration of convenience.

SUMMARY OF THE INVENTION

The present invention has been accomplished under the above-mentioned circumstances, and it is an object thereof to prevent erroneous determination of a control object even when the reliability of a future travel locus of the subject vehicle is degraded.

In order to achieve the above-mentioned object, according to a first feature of the invention, there is provided a vehicular control object determination system comprising: an object detector for detecting an object that is present in the direction of travel of a vehicle; a travel locus estimator for estimating a future travel locus of the vehicle; a control object determiner for determining a control object based on a detection result obtained by the object detector, a travel locus estimated by the travel locus estimator, and predetermined control object determination conditions; a relative sideways speed detector for detecting a sideways speed relative to a subject vehicle of the object detected by the object detector; and a comparator for comparing the relative sideways speed detected by the relative sideways speed detector with a predetermined threshold value; the control object determiner modifying the control object determination conditions when the estimated travel locus is not a straight line and the detected relative sideways speed is less than the threshold value.

With the first feature of the present invention, when the control object determiner determines a control object based on the result of the object detector detecting an object that is present in the direction of travel of the vehicle, the future travel locus of the subject vehicle estimated by the travel locus estimator, and the predetermined control object determination conditions, if the travel locus estimated by the travel locus estimator is not a straight line and, as a result of the comparator comparing the relative sideways speed detected by the relative sideways speed detector with the threshold value, the relative sideways speed is less than the threshold value, the control object determination conditions are modified. Therefore, it is possible to set appropriate control object determination conditions according to the state of the travel locus and the relative sideways speed, thereby appropriately determining a control object.

According to a second feature of the present invention, in addition to the first feature, the control object determiner excludes from determination of a control object an object that is farther than a predetermined distance from the subject vehicle, and reduces the predetermined distance when the estimated travel locus is not a straight line and the detected relative sideways speed is less than the threshold value.

With the second feature of the present invention, when an object detected at a position that is farther than the predetermined distance from the subject vehicle, where the accuracy with which the travel locus is estimated is degraded, is excluded from determination of the control object, if the estimated travel locus is not a straight line and the detected relative sideways speed is less than the threshold value, the predetermined distance is reduced. Therefore, it is possible to prevent a distant preceding vehicle in an adjacent lane on a straight road from being misidentified as the control object, thereby appropriately determining a control object.

According to a third feature of the present invention, in addition to the first feature, when the estimated travel locus is not a straight line and the detected relative sideways speed is less than the threshold value, the control object determiner delays the timing of determining as a control object an object that is farther than a predetermined distance.

With the third feature of the present invention, if the estimated travel locus is not a straight line and the detected relative sideways speed is less than the threshold value, the timing of determining as the control object an object that is farther than the predetermined distance is delayed. Therefore, any influence from momentary swings of the travel locus or noise is excluded in circumstances where a distant preceding vehicle in an adjacent lane on a straight road could easily be misidentified as the control object, and it is possible to determine as the control object a preceding vehicle that is as distant as possible, without degrading the determination accuracy.

According to a fourth feature of the invention, there is provided a vehicular control object determination system comprising: an object detector for detecting an object that is present in the direction of travel of a vehicle; a travel locus estimator for estimating a future travel locus of the vehicle; a control object determiner for determining a control object based on a detection result obtained by the object detector, a travel locus estimated by the travel locus estimator, and predetermined control object determination conditions; a relative sideways speed detector for detecting a sideways speed relative to a subject vehicle of the object detected by the object detector; and a comparator for comparing the relative sideways speed detected by the relative sideways speed detector with a predetermined threshold value; the control object determiner modifying the control object determination conditions when the estimated travel locus is a straight line and the detected relative sideways speed is equal to or greater than the threshold value.

With the fourth feature of the present invention, when the control object determiner determines a control object based on the result of the object detector detecting an object that is present in the direction of travel of the vehicle, the future travel locus of the subject vehicle estimated by the travel locus estimator, and the predetermined control object determination conditions, if the travel locus estimated by the travel locus estimator is a straight line and, as a result of the comparator comparing the relative sideways speed detected by the relative sideways speed detector with the threshold value, the relative sideways speed is equal to or greater than the threshold value, the control object determination conditions are modified. Therefore, it is possible to set appropriate control object determination conditions according to the state of the travel locus and the relative sideways speed, thereby appropriately determining a control object.

According to a fifth feature of the present invention, in addition to the fourth feature, the control object determiner excludes from determination of a control object an object that is farther than a predetermined distance from the subject vehicle, and reduces the predetermined distance when the estimated travel locus is a straight line and the detected relative sideways speed is equal to or greater than the threshold value.

With the fifth feature of the present invention, when an object detected at a position that is farther than the predetermined distance from the subject vehicle, where the accuracy with which the travel locus is estimated is degraded, is excluded from determination of the control object, if the estimated travel locus is a straight line and the detected relative sideways speed is equal to or greater than the threshold value, the predetermined distance is reduced. Therefore, it is possible to prevent a distant preceding vehicle that is about to enter a curve in an adjacent lane from being misidentified as the control object, thereby appropriately determining a control object.

According to a sixth feature of the present invention, in addition to the fourth feature, when the estimated travel locus is a straight line and the detected relative sideways speed is equal to or greater than the threshold value, the control object determiner delays the timing of determining as a control object an object that is farther than a predetermined distance.

With the sixth feature of the present invention, if the estimated travel locus is a straight line and the detected relative sideways speed is equal to or greater than the threshold value, the timing of determining as the control object an object that is farther than the predetermined distance is delayed. Therefore, any influence from momentary swings of the travel locus or noise is excluded in circumstances where a distant preceding vehicle that is about to enter a curve in the adjacent lane could easily be misidentified as the control object, and it is possible to determine as the control object a preceding vehicle that is as distant as possible, without degrading the determination accuracy.

According to a seventh feature of the present invention, in addition to any of the first to sixth features, the system further comprises a vehicle speed sensor for detecting a vehicle speed and a yaw rate sensor for detecting a yaw rate, and the travel locus estimator estimates a future travel locus of the vehicle based on the vehicle speed detected by the vehicle speed sensor and the yaw rate detected by the yaw rate sensor.

In accordance with the seventh feature of the present invention, since the future travel locus of the vehicle is estimated based on the vehicle speed detected by the vehicle speed sensor and the yaw rate detected by the yaw rate sensor, the travel locus can be estimated with good accuracy, A radar device of an embodiment corresponds to the object detector of the present invention.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 is a block diagram of a control system for an ACC system;

FIG. 2 is a flowchart for explaining the operation;

FIG. 3 is a diagram for explaining a method for estimating a future travel locus of a subject vehicle; and FIG. 4 is a diagram for explaining the operation when a preceding vehicle in an adjacent lane is misidentified as a control object.

FIG. 5 is a flowchart for explaining the operation; and

FIG. 6 is a diagram for explaining the operation when a preceding vehicle in an adjacent lane is misidentified as the control object.

DETAILED DESCRIPTION OF THE PREFERRED EMBODIMENT

Figure 1:
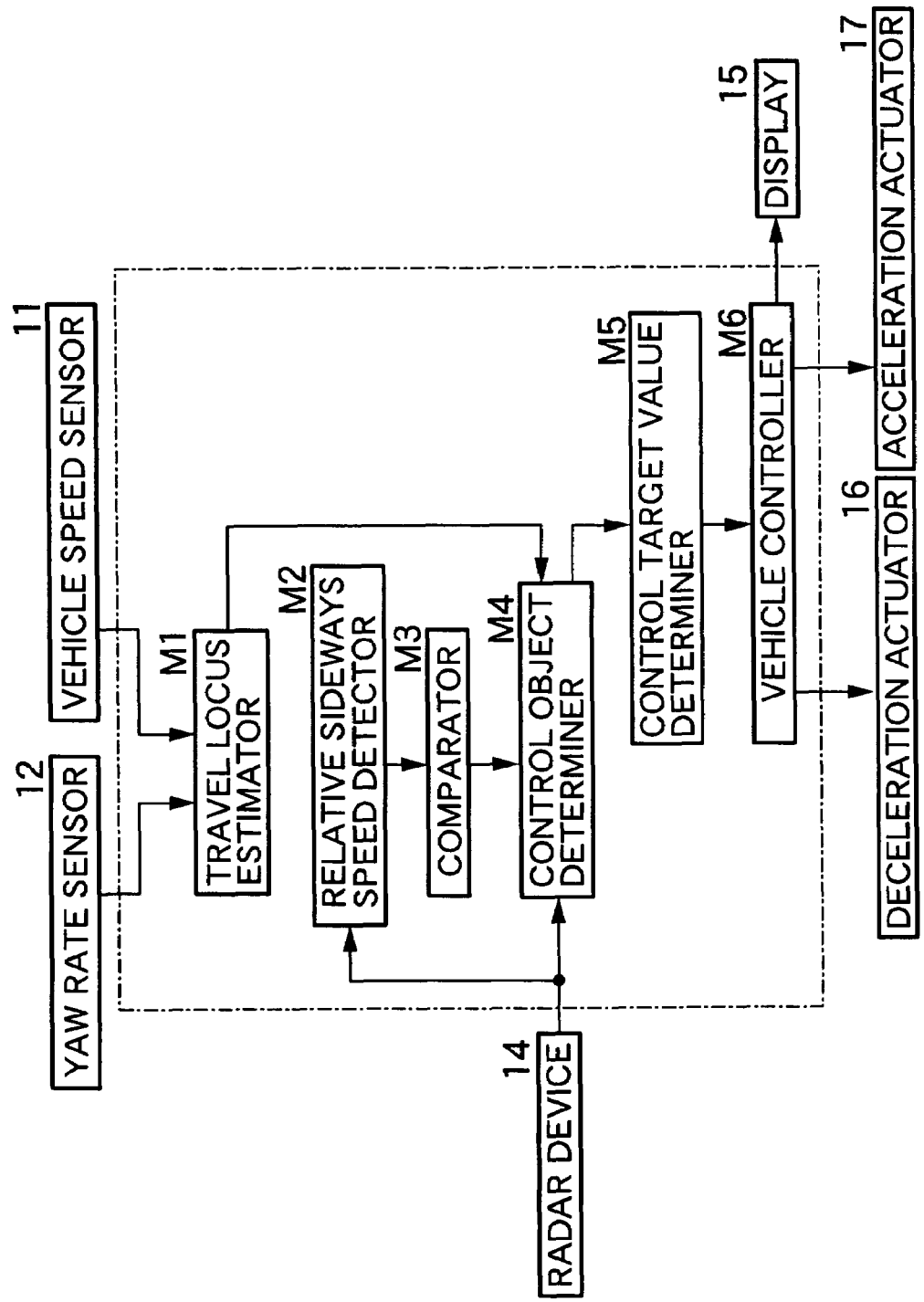
FIG. 1 to FIG. 4 show a first embodiment of the present invention.

As shown in FIG. 1, an ACC (Adaptive Cruise Control) system which maintains a preset inter-vehicle distance when there is a preceding vehicle, thus tracking the preceding vehicle, and maintains a preset vehicle speed when there is no preceding vehicle, thus keeping the speed constant. The ACC system includes: travel locus estimator MI; relative sideways speed detector M2; comparator M3; control object determiner M4; control target value determiner M5; and vehicle controller M6.

Connected to the travel locus estimator M1 are a vehicle speed sensor 11 and a yaw rate sensor 12. Connected to the relative sideways speed detector M2 and the control object determiner M4 is a radar device 14. Connected to the vehicle controller M6 are a display 15, a deceleration actuator 16, and an acceleration actuator 17.

Figure 3:
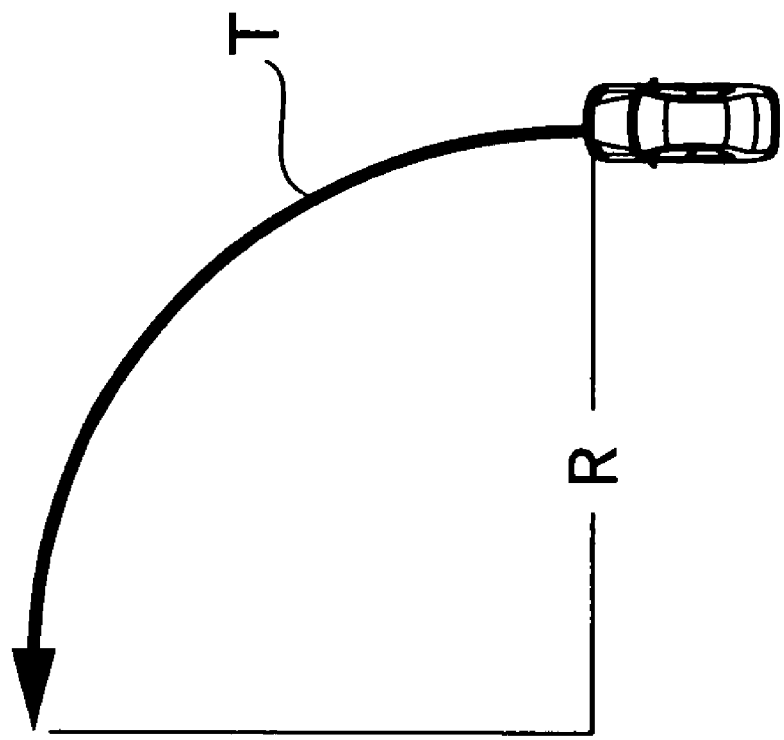

As shown in FIG. 3, the travel locus estimator M1 estimates a future travel locus T of a subject vehicle based on a vehicle speed detected by the vehicle speed sensor 11 and a yaw rate detected by the yaw rate sensor 12. That is, since a turning radius R of the vehicle can be calculated from a present vehicle speed and yaw rate, the future travel locus T of the subject vehicle can be estimated by joining an arc having the turning radius R to a present direction of travel of the subject vehicle.

The relative sideways speed detector M2 compares a previous position of the preceding vehicle detected by the radar device 14 with a current position, and detects a relative sideways speed of the preceding vehicle from a displacement between the two positions in the sideways direction with respect to the direction of travel of the subject vehicle. The comparator M3 compares the relative sideways speed detected by the relative sideways speed detector M2 with a prestored threshold value.

The control object determiner M4 determines as the control object a preceding vehicle that is present up to, for example, 100 m ahead on the estimated travel locus, and when the future travel locus of the subject vehicle estimated by the travel locus estimator M1 is not a straight line and, as a result of the comparator M3 comparing the relative sideways speed detected by the relative sideways speed detector M2 with the threshold value, the relative sideways speed is less than the threshold value, a preceding vehicle that is present up to, for example, 70 m ahead, which is shorter than 100 m, is determined as the control object.

Figure 4:
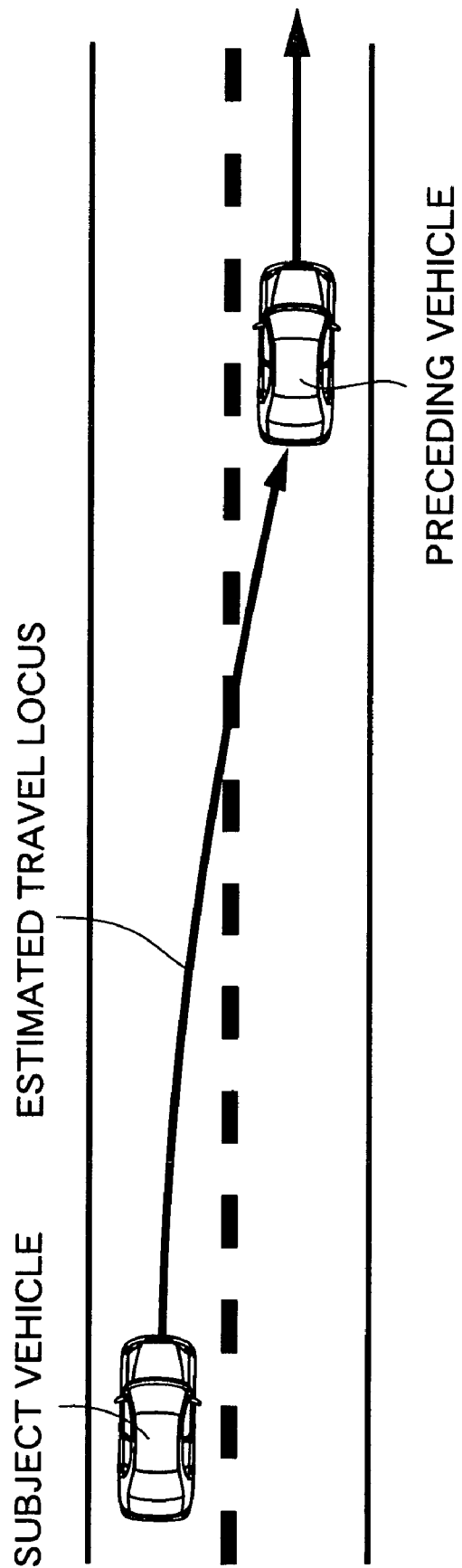

As shown in FIG. 4, even when the subject vehicle travels on a straight road, there is a case in which, due to a slight change in the yaw rate, the future travel locus is not estimated as being a straight line, and the difference between the erroneously estimated future travel locus and the actual travel locus increases with the increase of the distance from the subject vehicle. In such a case, if a preceding vehicle is present on the erroneously estimated future travel locus, there is a possibility that the preceding vehicle might be erroneously determined as the control object. However, in this case, since the relative sideways speed between the subject vehicle and the preceding vehicle on the straight road is almost 0, it is possible to prevent the preceding vehicle from being erroneously determined as the control object by excluding a preceding vehicle farther than 70 m from determination of the control object, that is, by reducing the maximum distance for which it is determined whether or not it is the control object from 100 m to 70 m.

The control target value determiner M5 determines a target vehicle speed, a target acceleration/deceleration, a target inter-vehicle distance, etc., which are parameters used for making the subject vehicle track the preceding vehicle that is the control object. The vehicle controller M6 operates the deceleration actuator 16 and the acceleration actuator 17 based on a control target value determined by the control target value determiner M5 so as to make a throttle valve open and close or operate a brake system, thus carrying out tracking control or constant speed travel control, and displays a present control state of the vehicle on the display 15 so as to inform a driver thereof.

When the relative sideways speed is less than the threshold value, determination of whether or not the detected object is the control object may not be carried out immediately but may be carried out with a predetermined time delay. By so doing, it is possible to prevent the determination distance from being unnecessarily shortened due to the effect of a momentary swing in the travel locus or noise and to determine as the control object a preceding vehicle that is as distant as possible, without degrading the determination accuracy.

Figure 2:
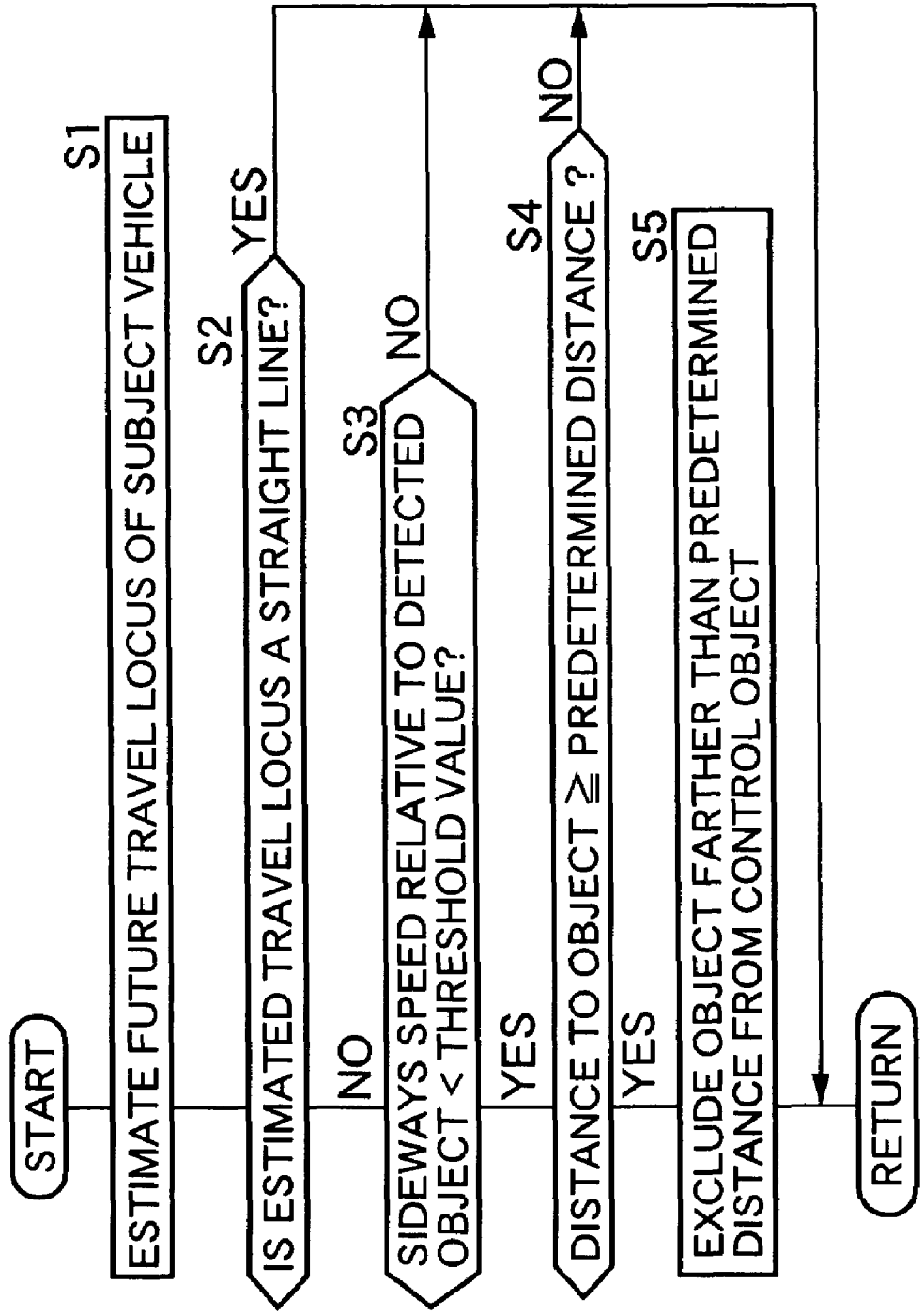

The operation of the first embodiment is further explained by reference to the flowchart of FIG. 2.

Firstly in step S1 the travel locus estimator M1 estimates the future travel locus of the subject vehicle based on the yaw rate and the vehicle speed. If in the subsequent step S2 the future travel locus of the subject vehicle is not a straight line, then in step S3 the relative sideways speed detector M2 detects the relative sideways speed of the object, and the comparator M3 compares the relative sideways speed with the threshold value. If the relative sideways speed is less than the threshold value and in step S4 the distance to the object is equal to or greater than the predetermined distance (e.g., 70 m), then in step S5 an object more distant than the predetermined distance is excluded from determination of whether or not it is the control object. In other words, the maximum distance for which it is determined whether or not the detected object is the control object is reduced from a normal distance (e.g., 100 m) to the predetermined distance.

Figure 5:
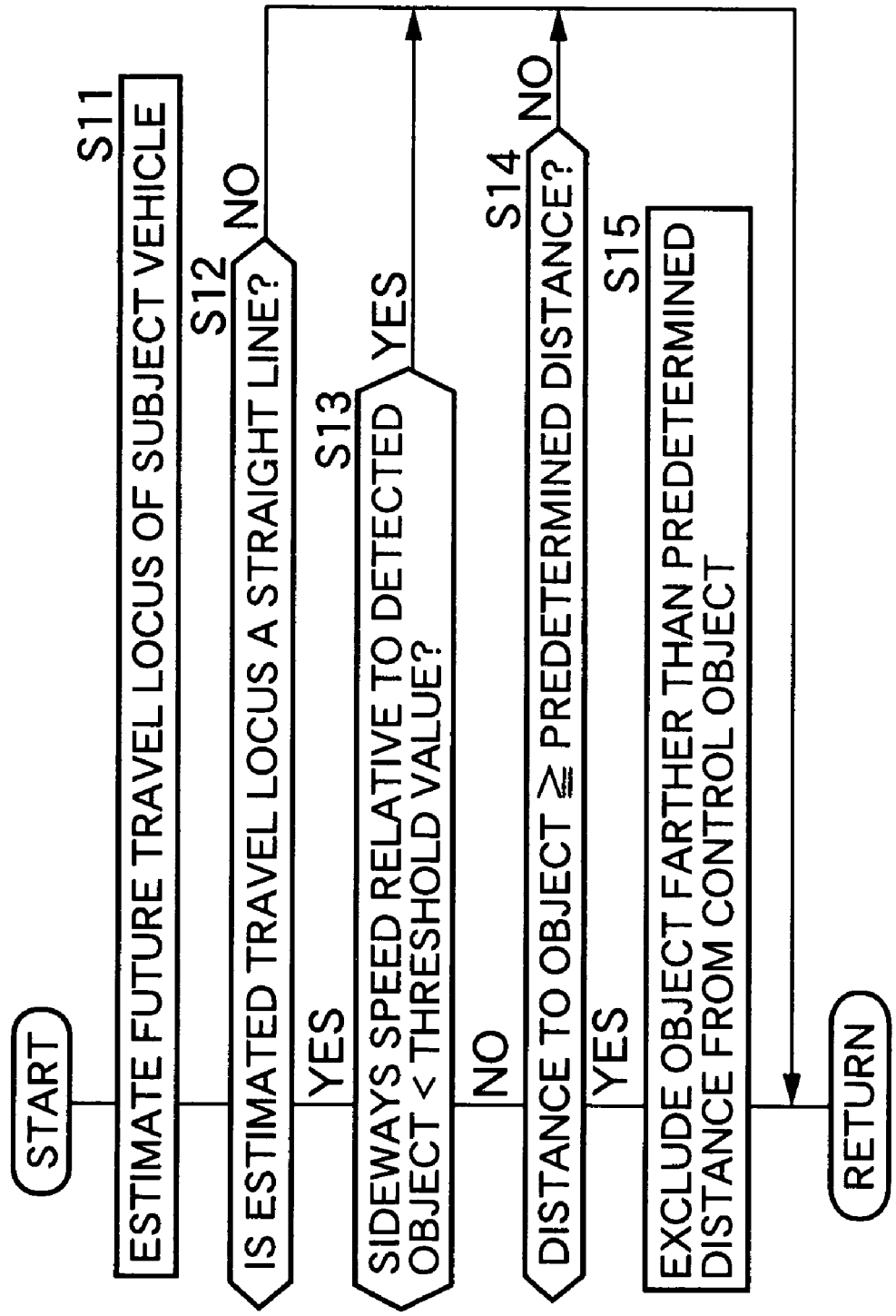
FIG. 5 and FIG. 6 show a second embodiment of the present invention.

A second embodiment of the present invention is now explained by reference to FIG. 5 and FIG. 6. The block diagram of a control system of an ACC system of the second embodiment is the same as that of the first embodiment shown in FIG. 1.

Figure 6:
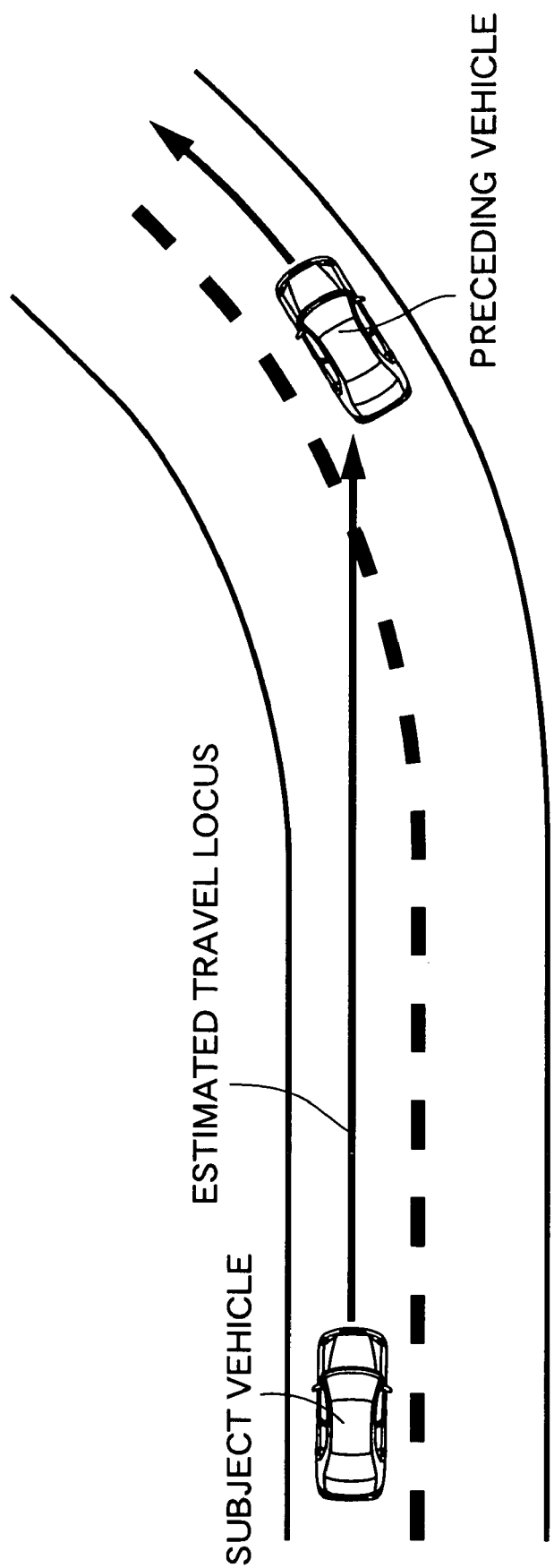

As shown in FIG. 6, when a subject vehicle approaches the entrance of a left curve, a future travel locus is estimated as being a straight line. However, since a preceding vehicle traveling on the curve crosses the travel locus of the subject vehicle, there is a possibility that the preceding vehicle might be erroneously determined as the control object, and the possibility increases with the increase of the distance from the subject vehicle. In such a case, since there is a difference in the angle between the direction of travel of the subject vehicle and the direction of travel of the preceding vehicle, the relative sideways speed increases and exceeds the threshold value. Then, although a preceding vehicle within 100 m is originally determined as the control object, by excluding a preceding vehicle farther than 70 m as the control object, that is, by reducing the maximum distance for which it is determined whether or not it is the control object from 100 m to 70 m, it is possible to prevent the preceding vehicle from being erroneously determined as the control object.

In this second embodiment also, when the relative sideways speed is less than the threshold value, determination of whether or not the detected object is the control object may not be carried out immediately but may be carried out with a predetermined time delay. By so doing, it is possible to prevent the determination distance from being unnecessarily shortened due to a momentary swing in the travel locus or noise, and to determine as the control object a preceding vehicle that is as distant as possible without degrading the determination accuracy.

The operation of the second embodiment is further explained by reference to the flowchart of FIG. 5.

Firstly in step S11 the travel locus estimator MI estimates the future travel locus of the subject vehicle based on the yaw rate and the vehicle speed. In the subsequent step S12, when the future travel locus of the subject vehicle is a straight line, then in step S13 the relative sideways speed detector M2 detects the relative sideways speed of the object, and the comparator M3 compares the relative sideways speed with the threshold value. If the relative sideways speed is equal to or greater than the threshold value and in step S14 the distance to the object is equal to or greater than the predetermined distance (e.g., 70 m), then in step S15 an object more distant than the predetermined distance is excluded from determination of whether or not it is the control object. In other words, the maximum distance for which it is determined whether or not the detected object is the control object is reduced from the normal distance (e.g., 100 m) to the predetermined distance.

Although embodiments of the present invention have been described above, the present invention can be modified in a variety of ways without departing from the subject matter of the present invention.

For example, an ACC system has been described in the embodiments, but the present invention is not limited to the ACC system and is applicable to a vehicular travel locus estimation system or a vehicular control object determination system for any purpose.

What is claimed is:

1. A vehicular control object determination system comprising:
   an object detector for detecting an object that is present in the direction of travel of a vehicle;
   a travel locus estimator for estimating a future travel locus of the vehicle;
   a control object determiner for determining a control object based on a detection result obtained by the object detector, a travel locus estimated by the travel locus estimator, and predetermined control object determination conditions;
   a relative sideways speed detector for detecting a sideways speed relative to a the vehicle of the object detected by the object detector; and
   a comparator for comparing the relative sideways speed detected by the relative sideways speed detector with a predetermined threshold value;
   the control object determiner modifying the control object determination conditions when the estimated travel locus is not a straight line and the detected relative sideways speed is less than the threshold value.

2. The vehicular control object determination system according to claim 1, wherein the control object determiner excludes from determination of a control object an object that is farther than a predetermined distance from the vehicle, and reduces the predetermined distance when the estimated travel locus is not a straight line and the detected relative sideways speed is less than the threshold value.

3. The vehicular control object determination system according to claim 1, wherein when the estimated travel locus is not a straight line and the detected relative sideways speed is less than the threshold value, the control object determiner delays the timing of determining as a control object an object that is farther than a predetermined distance.

4. The vehicular control object determination system according to claim 1, further comprising a vehicle speed sensor for detecting a vehicle speed and a yaw rate sensor for detecting a yaw rate, and the travel locus estimator estimates a future travel locus of the vehicle based on the vehicle speed detected by the vehicle speed sensor and the yaw rate detected by the yaw rate sensor.

5. A vehicular control object determination system comprising:
   an object detector for detecting an object that is present in the direction of travel of a vehicle;
   a travel locus estimator for estimating a future travel locus of the vehicle;
   a control object determiner for determining a control object based on a detection result obtained by the object detector, a travel locus estimated by the travel locus estimator, and predetermined control object determination conditions;
   a relative sideways speed detector for detecting a sideways speed relative to a the vehicle of the object detected by the object detector; and
   a comparator for comparing the relative sideways speed detected by the relative sideways speed detector with a predetermined threshold value;
   the control object determiner modifying the control object determination conditions when the estimated travel locus is a straight line and the detected relative sideways speed is equal to or greater than the threshold value.

6. The vehicular control object determination system according to claim 5, wherein the control object determiner excludes from determination of a control object an object that is farther than a predetermined distance from the vehicle, and reduces the predetermined distance when the estimated travel locus is a straight line and the detected relative sideways speed is equal to or greater than the threshold value.

7. The vehicular control object determination system according to claim 5, wherein when the estimated travel locus is a straight line and the detected relative sideways speed is equal to or greater than the threshold value, the control object determiner delays the timing of determining as a control object an object that is farther than a predetermined distance.

8. The vehicular control object determination system according to claim 5, wherein the system further comprises a vehicle speed sensor for detecting a vehicle speed and a yaw rate sensor for detecting a yaw rate, and the travel locus estimator estimates a future travel locus of the vehicle based on the vehicle speed detected by the vehicle speed sensor and the yaw rate detected by the yaw rate sensor.

9. A method for determining a control object for a vehicle comprising:
   detecting an object that is present in the direction of travel of the vehicle;
   estimating a future travel locus of the vehicle;
   determining a control object based on a detection result, a travel locus, and predetermined control object determination conditions;
   detecting a sideways speed relative to a subject the vehicle of the detected object;
   comparing the relative sideways speed with a predetermined threshold value; and
   modifying the control object determination conditions when the estimated travel locus is not a straight line and the detected relative sideways speed is less than the threshold value.

10. The method according to claim 9, further comprising excluding from determination of a control object an object that is farther than a predetermined distance from the vehicle, and reducing the predetermined distance when the estimated travel locus is not a straight line and the detected relative sideways speed is less than the threshold value.

11. The method according to claim 9, wherein when the estimated travel locus is not a straight line and the detected relative sideways speed is less than the threshold value, delaying the timing of determining as a control object an object that is farther than a predetermined distance.

12. The method according to claim 9, further comprising detecting a vehicle speed and a yaw rate, and estimating a future travel locus of the vehicle based on at least one of the vehicle speed and the yaw rate.

13. A method for determining a vehicular control object comprising:
   detecting an object that is present in the direction of travel of a vehicle;
   estimating a future travel locus of the vehicle;
   determining a control object based on a detection result, a travel locus, and predetermined control object determination conditions;
   detecting a sideways speed relative to the vehicle of the detected object;
   comparing the relative sideways speed with a predetermined threshold value; and modifying the control object determination conditions when the estimated travel locus is a straight line and the detected relative sideways speed is equal to or greater than the threshold value.

14. The method according to claim 13, further comprising excluding from determination of a control object an object that is farther than a predetermined distance from the vehicle, and reducing the predetermined distance when the estimated travel locus is a straight line and the detected relative sideways speed is equal to or greater than the threshold value.

15. The method according to claim 13, wherein when the estimated travel locus is a straight line and the detected relative sideways speed is equal to or greater than the threshold value, delaying the timing of determining as a control object an object that is farther than a predetermined distance.

16. The method according to claim 13, further comprising detecting a vehicle speed and a yaw rate, and estimating a future travel locus of the vehicle based on at least one of the vehicle speed and the yaw rate.

* * * * *